INVENTOR.
W. R. EDDY

INVENTOR.
W. R. EDDY

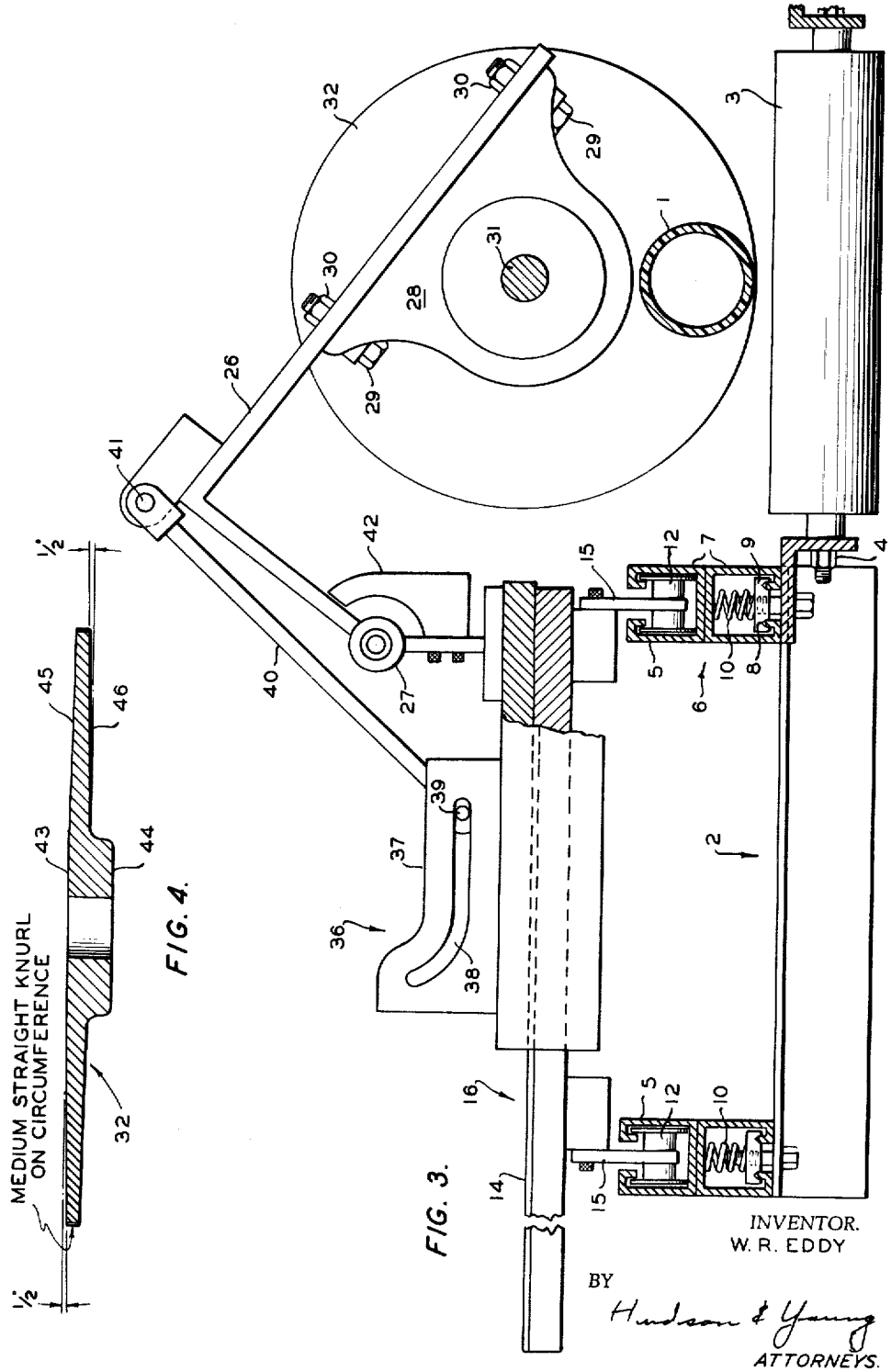

United States Patent Office 2,994,923
Patented Aug. 8, 1961

2,994,923
METHOD FOR CUTTING PIPE WHILE MAINTAINING INTERNAL PRESSURE
William R. Eddy, Bartlesville, Okla., assignor to Phillips Petroleum Company, a corporation of Delaware
Filed Oct. 28, 1957, Ser. No. 692,642
8 Claims. (Cl. 18—47.5)

This invention relates to method and apparatus for maintaining internal pressure in a pipe or tube during and after a cutting operation. In one of its more specific aspects it relates to method and apparatus for cutting thermoplastic pipe or tube into lengths while maintaining pressure therein.

Extrusion is a frequently used technique in producing pipe and tubing. It is generally used in the production of pipe and tubing made from thermoplastic materials such as "Nylon," polyvinyl acetate, polyvinyl chloride, and polyolefins, especially polyethylene.

In production of pipe and tubing from thermoplastic material the pipe is very soft immediately after extrusion and the walls thereof readily collapse during subsequent forming and cutting operations. One technique for preventing collapse has been to apply internal pressure to the soft pipe at the point of extrusion. Air pressure is commonly used. The pipe is then hardened by cooling and then cut into lengths.

Obviously, the entire length of the pipe, soft and hard, is subject to this pressure. When the hardened portion of the pipe is cut, pressure falls and the soft part of the pipe then collapses. The collapsed portion forms a waste nipple which must then be cut out and thrown away. To prevent such waste and collapse, the end of the pipe has been plugged by various means in order to stop the air from leaking out. One way of plugging has been to hold a plug internally of the pipe by the use of a magnetic field; this plug is disposed between the pressure source and the cut-off tool. Defects in this solution are that the plug cannot fit too tightly because the pipe moves relative to it and therefore pressure is lost, and that if the magnetic field fails, pressure differential will blow the plug out of the pipe. Another commonly used technique for trying to maintain pressure is to rapidly cut the pipe and to quickly plug the open end of the pipe. This is done manually, as a general rule, and results in a waste of pipe due to collapse of the soft portion, which in turn slows down production, increases labor costs and creates a safety hazard due to the strong possibility of the plug being blown from the end of the pipe.

This invention eliminates all plugs as such by maintaining the cut-off blade in position to block the end of the pipe. By use of this invention a very small leakage of pressure occurs, safety hazards and waste are eliminated, production may be increased, and costs reduced.

Accordingly it is an object of this invention to provide an apparatus for effectively sealing the end of the pipe during production.

A further object is to provide apparatus for sealing the end of the pipe during and subsequent to cutting.

Still another object of this invention is to permit continuous production of the pipe without substantial loss of interior pressure.

Another object is to provide a method for maintaining pressure during production and another object of the invention is to provide a method for maintaining pressure by holding the cut-off tool over the end of the pipe subsequent to the cut-off operation.

Other objects and advantages will be apparent from the following disclosure.

FIGURE 3 is a cross-sectional view of the cutting machine of FIGURE 1 and 2 and some of its subassemblies.

FIGURE 4 is a cross-sectional view of a preferred embodiment of the cutter.

Figure 1:
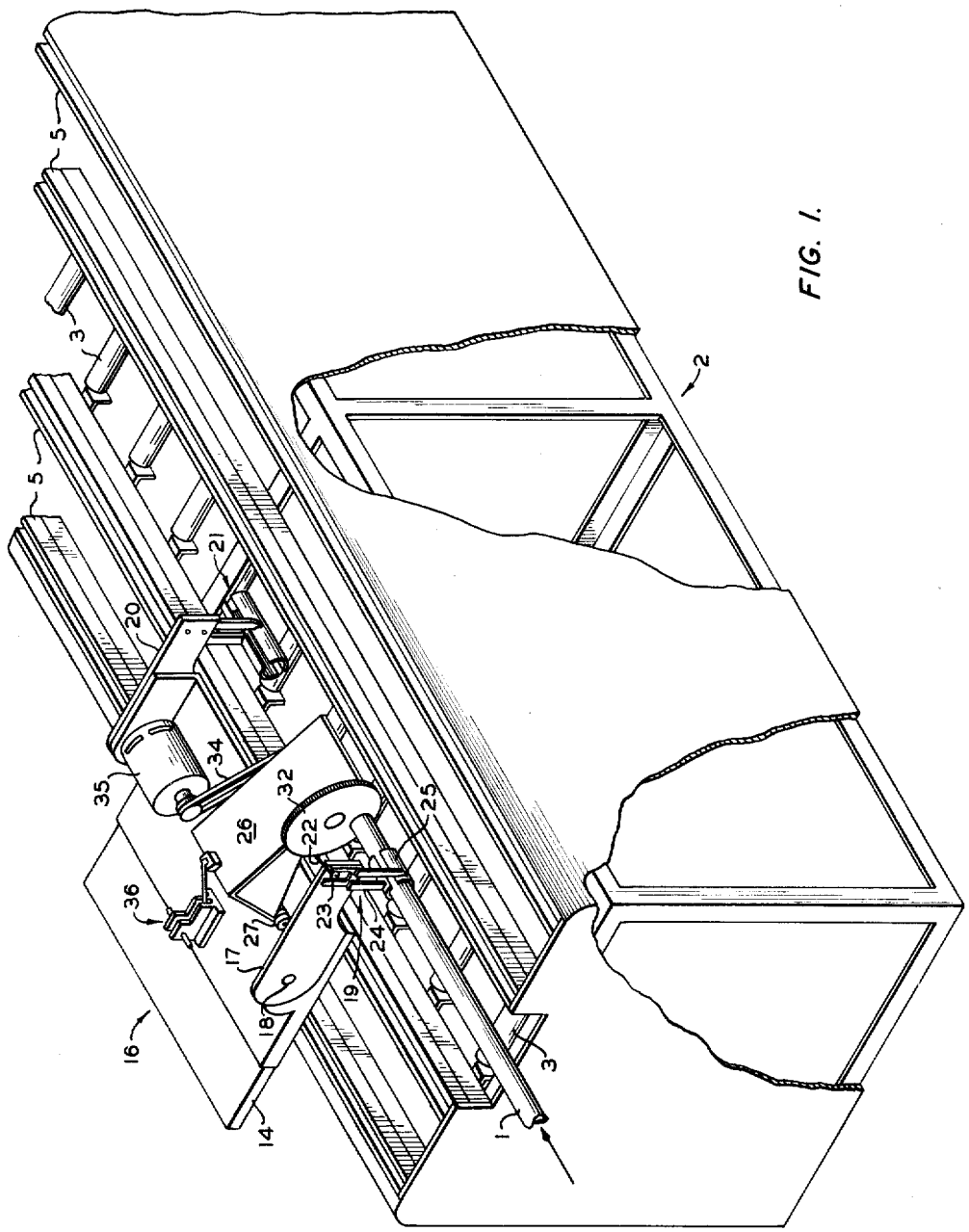
FIGURE 1 is an isometric view of a portion of the apparatus showing the cutter being held in sealing position.
Figure 2:
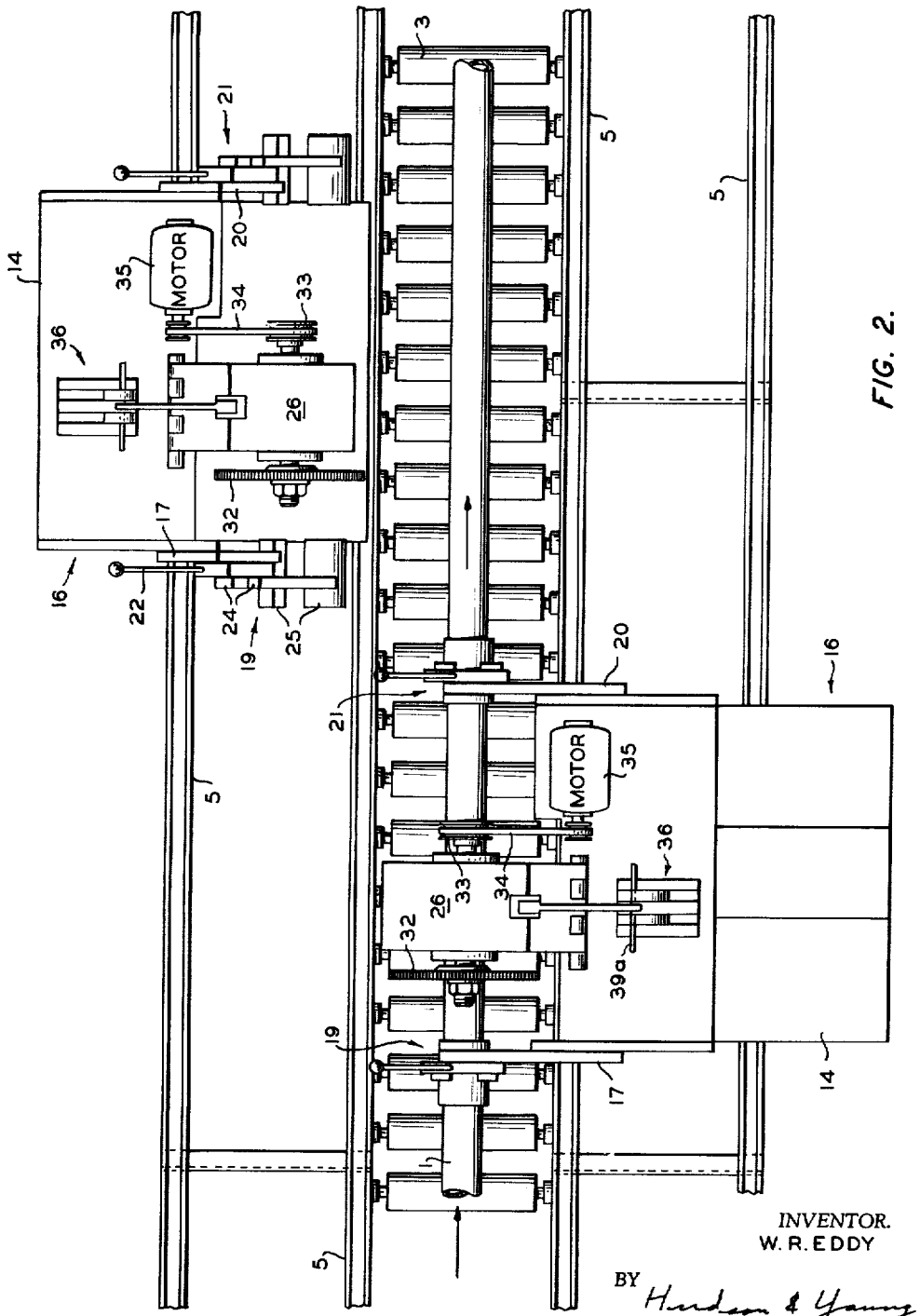
FIGURE 2 is a plan view of one embodiment of the apparatus including that portion which is shown in FIGURE 1.

Referring to FIGURES 1, 2, and 3 a continuous length of extruded pipe 1 is being fed into the machine which includes a frame 2, preferably welded that supports rollers 3 which are held in place by bolts 4. Two sets of tracks 5 are disposed at opposite sides of the rollers 3. The tracks are parallel to the pipe 1 and are bolted to frame 2 with "Unistrut" assemblies 6. Each "Unistrut" assembly 6 comprises two channels 7 placed back-to-back, as shown, and having internal flanges 8. Nuts 9 with grooves matching the flanges are urged down upon the flanges by spring 10 whereby bolt 11 can be screwed in without having to use a wrench on nut 9. Of course, other fastening means could be used. The upper channels 7 are engaged by rollers 12 which are joined to bed 14 through struts 15. The rollers 12 and bed 14 are portions of cutting machine assembly 16.

Cutting machine assembly 16 pivotally supports arm 17 at 18 as best seen in FIGURE 1. Arm 17 has a clamp assembly 19 at the outboard end thereof. Arm 20 is mounted on the other side of cutting machine assembly 16 and is pivoted to the bed 14 in the same manner as is arm 17. A clamp assembly 21 constructed in like manner as clamp assembly 19 is mounted at the outboard end of arm 20.

Clamp assemblies 19 and 21 are constructed and operated alike. As most clearly shown in FIGURE 1 each includes a handle 22 fixed to a cam 23 which pivots on the arm 17. Clamp arms 24 are pivoted to the respective arms at points below the pivot of cam 23 and have clamp jaws 25 at the lower end thereof. Cam 23 is shaped so that rotation of handle 22 toward pipe 1 (as seen in FIGURE 1) spreads the upper part of arms 24 apart thereby causing jaws 25 to move together to clamp. The clamp asemblies would preferably include means to bias jaws 25 apart when arms 24 are not engaged by the cam.

Also mounted on bed 9 between the arms 6 and 15 is a bracket 26 pivotally supported by strut 27 which is in turn fixed to bed 14 by conventional means such as welding or bolting. As seen in FIGURE 3, bracket 26 includes a pillow block 28 secured thereto by bolts 29 and nuts 30. A shaft 31 is mounted in the pillow block and has a cutter 32 bolted to one end and a pulley 33 fixed to the other end. Belt 34 transmits power from a motor 35 through pulley 33 to the cutter. In the preferred construction, clamp assembly 19 is disposed so that it grips pipe 1 as close to cutter 32 as is practicable.

On bed 14 is located blade locking assembly 36 which is best seen in FIGURE 3. Blade locking assembly 36 includes cam brackets 37 each having a cam slot 38 therein being engaged by cam follower 39 which are extended to the sides to form handles 39a (see FIGURE 2). Cam follower 39 is fixed to one end of link 40 which is pivotally connected to bracket 26 at 41. The shape of the cam slot is such that motion of follower 39 to the left end of the slot (as viewed in FIGURE 3) disengages cutter 32 from the cutting position and then locks the cutter in disengaged position; motion of follower 39 to the right engages the cutter with the pipe, but interference with the rollers is prevented by the stop 42 mounted on strut 27.

FIGURE 4 shows a diametral cross-section of a preferred embodiment of cutter 32. The cutter is flat at hub positions 43 and 44 which are made parallel in order to prevent bending the shaft on which the cutter is mounted when tightening up on the mounting bolt on the end of the shaft. The cutter is tapered along surfaces 45 and 46 to its periphery for easier cutting and to prevent pinching the cutter by the pipe or tube during cutting. As is obvious from FIGURE 3, the surfaces 45 and 46 must be of such dimensions as to allow blocking the internal cross-section of the pipe. Preferably, the cutter is knurled or has fine teeth on its circumference but this is optional and a cutter with no teeth at all may be used. The cutter is made considerably thicker (½" as shown) than an ordinary circular saw blade because air pressure from the upstream side of the pipe will flex an ordinary saw blade destroying both the desired sealing effect and the desired square cut-off.

Operation will be described using FIGURE 2, unless otherwise noted, remembering that the embodiment shown is manually operated. The following description of operation applies to both cutting machines but for simplicity only the operation of the lefthand machine will be described.

Upon a sufficient length of pipe 1 being fed into the machine, arm 20 is swung down and the clamp assembly 21 is engaged. When clamp assembly 21 is engaged, pipe 1 then pushes cutting machine assembly 16 along tracks 5. By moving the entire cutting machine along with the pipe, a cut at the desired angle may be obtained and once the cut is complete it becomes possible to hold the pipe 1 adjacent the cutter. Next arm 17 is swung down, and clamp assembly 19 is engaged (as best seen in FIGURE 1) by pushing on handle 22.

At this time the pipe is supported by clamp assemblies 19 and 21 and is ready to be cut. Handles 39a are pushed from the locking position in cam slot 38 to such a position that the cutter 32 begins to cut the pipe. The cutter can descend on through the pipe by virtue of its own weight and is stopped by the stop 42 before it can strike and cut the rollers 3.

When the pipe has been completely cut, clamp 21 can be disengaged from the pipe and this permits the severed portion of the pipe which had been held by clamp assembly 21 to be removed. However, when the machine has reached this point, clamp 19 is holding the pipe, which remains under pressure, closely adjacent the cutter. The only clearance between pipe 1 and cutter 32 is a slight one that is created by the cutter in the cutting operation. The pipe and cutter are maintained in this relationship until a similar cutting operation has been performed by the righthand cutting machine assembly upstream of the point where cutter 32 is being held. By maintaining clamp assembly 19 in an engaged position during this time, the entire left hand cutting machine assembly 16 continues to move along the tracks 5 at the same speed as the pipe. The cutter 32 continues to rotate subsequent to cutting, although this feature is optional.

When the pipe which clamp assembly 19 engages has been severed upstream, preferably by using the other cutting machine in the above described manner, handles 39a can be pulled back into the locking position of cam slots 38 thereby causing the cutter to move up and away from the pipe 1. Then clamp assembly 19 is disengaged by pulling handle 22 to the rear of cutting machine assembly 16 and the pipe previously held by the clamp assembly 19 can be removed. The entire cutting machine assembly 16 can now be rolled back along tracks 5 to a position where the foregoing sequence of operations can be repeated.

In actual operation one embodiment of this machine cut 2 inch polyethylene pipe extruded at a rate of 2½ ft. per minute and held a pressure of 31.5 p.s.i.g. from an initial air pressure of 34 p.s.i.g. The ends of the pipe were square within desired tolerances.

In the embodiment of the machine shown, all elements are manually operated, e.g., clamps 8, 16, and clamping assembly 17. It is obvious that all of these elements can be automatically operated using suitable timing mechanisms for the desired sequence of operations and using hydraulic, pneumatic, or electrical actuating means. Further, the pivoted members such as arms 8 and 15 and bracket 11 could have reciprocating or other means substituted therefore to allow positioning of their respective pipe-engaging mechanisms.

While the invention is described in accordance with the present preferred embodiments it should be evident it is not limited thereto.

I claim as my invention:

1. A process for producing plastic pipe while preventing collapse thereof comprising forming a plastic mass; continuously extruding pipe from said mass; feeding a pressurized fluid into the extruded pipe; feeding the pipe to a clamping assembly; clamping the pipe; providing a cutting surface positioned adjacent a restricting surface that is adapted to block the end of the pipe; cutting the pipe at a point wherein said pressurized fluid obtains into two parts with the cutter whereby a first part continues to receive the pressurized fluid and a second part is severed; following the cutting surface during said cutting step with said restricting surface; maintaining the restricting surface adjacent the first part of the pipe in such a position that it substantially blocks the internal cross-sectional area of the pipe thereby preventing any substantial loss of pressurized fluid and at least for such a period of time that the preceding recited steps can be repeated on another portion of the pipe nearer to the place of extrusion by a second cutting and restricting surface; continuing to extrude the pipe from the time of the said clamping step through the said maintaining step; and repeating the said sequence of steps on said another portion of the pipe.

2. A process for cutting thermoplastic pipe during an extrusion process while maintaining superatmospheric pressure therein to prevent collapse thereof comprising producing a superatmospheric pressure in said pipe; feeding the pipe to a clamping assembly; clamping the pipe; providing a cutter having an impermeable surface of a shape and area substantially the same as the internal cross-section of the pipe; cutting the pipe at one end at a point wherein said superatmospheric pressure obtains into two parts with the cutter whereby a first part is still being extruded at the other end and a second part is severed; and maintaining for a predetermined time the impermeable surface of the cutter adjacent the first part of the pipe in such a position that it substantially blocks the internal cross-sectional area of the pipe.

3. A process for cutting thermoplastic pipe during its extrusion and while applying a positive internal fluid pressure in order to prevent collapse thereof comprising feeding the pipe to a clamping assembly; clamping the pipe; providing a cutter having an impermeable surface of a shape and area substantially the same as the internal cross-section of the pipe; cutting the pipe at a point wherein said internal fluid pressure obtains into two parts with the cutter whereby a first part remains subject to the internal fluid pressure and a second part is severed; maintaining the impermeable surface of the cutter adjacent the first part of the pipe in such a position that it substantially blocks the internal cross-sectional area of the pipe thereby preventing any substantial loss of fluid pressure and at least for such a period of time that the preceding recited steps can be repeated on another portion of the pipe nearer to the place of extrusion by a second cutter having an impermeable surface of a shape and area substantially the same as the internal cross-section of the pipe.

4. In a process that includes extruding a first portion of an elongated hollow article while feeding a pressurized fluid into the hollow part of the first portion of the article in order to prevent collapse thereof and while hardening a second portion of the extruded article and then cutting the thus hardened second portion; the improvement in said cutting step comprising clamping the hardened second portion; providing a cutter that presents an impermeable surface exposed to the entire hollow portion of the article when the cutter has passed completely through the article at an angle to the elongate axis of the article; moving the thus-provided cutter in a plane that passes through the elongate axis of and completely through the hardened second portion of the article at a point wherein said pressurized fluid obtains; and maintaining the impermeable surface of the cutter in sealing relation with the article and exposed to the pressurized fluid in said first portion of the article while repeating said steps of clamping, providing, and moving on another hardened portion of the article with a second cutter that is connected to the first portion of the article.

5. In a process that includes the steps of extruding pipe while feeding a pressurized fluid into the pipe to prevent collapse thereof, the improvement of executing the steps comprising providing first and second cutters each having an impermeable surface of an area at least equal to the internal cross-sectional area of the pipe; moving said first cutter transversely through the pipe at a point wherein said pressurized fluid obtains to thereby sever a length therefrom; and maintaining the impermeable surface of said first cutter exposed to the internal cross-sectional area of the pipe and in sealing engagement with said pipe until said step of moving is executed with said second cutter.

6. In a process that includes the steps of extruding pipe while feeding a pressurized fluid into the pipe, to prevent collapse thereof, the improvement of executing the steps comprising providing a rotatable cuter having a surface that exposes to pressurized fluid in the pipe a portion of the area of the surface that is at least equal to the internal cross-sectional area of the pipe when the cutter is rotated; rotating the cutter; moving the rotating cutter transversely through the pipe at a point wherein said pressurized fluid obtains to thereby sever a length therefrom; and maintaining said rotating cutter in sealing engagement with said pipe while keeping said surface exposed to the pressurized fluid in the pipe for a predetermined period of time.

7. In a process that includes the steps of extruding pipe while feeding a pressurized fluid into the pipe to prevent collapse thereof, the improvement of executing the steps comprising providing a rotatable cutter having a surface that exposes an area on said surface that is at least equal to the internal cross-sectional area of the pipe when the cutter is rotated; rotating the cuter; moving the rotating cutter transversely through the pipe at a point wherein said pressurized fluid obtains to thereby sever a length therefrom; and maintaining said surface exposed to the pressurized fluid in the internal cross-sectional area of the pipe until said steps of providing, rotating, and moving are executed by a second rotatable cutter having a surface that exposes an area on said surface that is at least equal to the internal cross-sectional area of the pipe when the cutter is rotated.

8. In a process that includes the steps of continuously extruding plastic pipe, feeding a pressurized fluid into the pipe to prevent collapse thereof while extruding it, and intermittently cutting the pipe at a point wherein said pressurized fluid obtains with a cutter, the improvement comprising using a cutter to restrict the flow of pressurized fluid out of the pipe in the time interval between a cutting step and the next succeeding step of cutting.

References Cited in the file of this patent

UNITED STATES PATENTS

| | | |
|---|---|---|
| 1,370,800 | Egerton | Mar. 8, 1921 |
| 1,828,793 | Van Buren | Oct. 27, 1931 |
| 2,293,260 | Johnston | Aug. 18, 1942 |
| 2,325,431 | Shippy | July 27, 1943 |
| 2,484,854 | Peters | Oct. 18, 1949 |
| 2,503,171 | Posner | Apr. 4, 1950 |
| 2,663,904 | Slaughter | Dec. 29, 1953 |
| 2,698,463 | Conwell et al. | Jan. 4, 1955 |

FOREIGN PATENTS

| | | |
|---|---|---|
| 739,152 | Great Britain | Oct. 26, 1955 |
| 512,602 | Italy | Feb. 1, 1955 |